United States Patent
Eck et al.

(10) Patent No.: US 10,246,069 B2
(45) Date of Patent: Apr. 2, 2019

(54) HAPTIC INTERFACE PROVIDING IMPROVED CONTROL OF THE HAPTIC SENSATION

(71) Applicant: COMMISSARIAT A L'ENERGIE ATOMIQUE ET AUX ENERGIES ALTERNATIVES, Paris (FR)

(72) Inventors: Laurent Eck, Palaiseau (FR); Jose Lozada, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 151 days.

(21) Appl. No.: 15/514,741

(22) PCT Filed: Sep. 29, 2015

(86) PCT No.: PCT/EP2015/072317
§ 371 (c)(1),
(2) Date: Mar. 27, 2017

(87) PCT Pub. No.: WO2016/050718
PCT Pub. Date: Apr. 7, 2016

(65) Prior Publication Data
US 2018/0229704 A1    Aug. 16, 2018

(30) Foreign Application Priority Data
Sep. 29, 2014  (FR) .................................. 14 59182

(51) Int. Cl.
*G06F 3/01*   (2006.01)
*H01H 3/00*   (2006.01)
(Continued)

(52) U.S. Cl.
CPC ............... *B60T 13/66* (2013.01); *B60K 35/00* (2013.01); *B60K 37/06* (2013.01); *G06F 3/016* (2013.01);
(Continued)

(58) Field of Classification Search
CPC ......... B60T 13/66; B60K 35/00; B60K 37/06; B60K 2350/92; B60K 2350/102; H01H 19/00; H01H 2003/008; G06F 3/016
See application file for complete search history.

(56) References Cited

U.S. PATENT DOCUMENTS

| 5,555,894 A | 9/1996 | Doyama et al. |
| 5,778,885 A | 7/1998 | Doyama et al. |

(Continued)

FOREIGN PATENT DOCUMENTS

| FR | 2 930 655 A1 | 10/2009 |
| WO | 2013/157205 A2 | 10/2013 |
| WO | 2015/033034 A1 | 3/2015 |

OTHER PUBLICATIONS

International Search Report dated Dec. 8, 2015 in PCT/EP2015/072317 filed Sep. 29, 2015.
(Continued)

*Primary Examiner* — Russell Frejd
(74) *Attorney, Agent, or Firm* — Oblon, McClelland, Maier & Neustadt, L.L.P.

(57) ABSTRACT

A haptic interface, including: a button moving in a first direction or in a second direction; an interaction element interacting with a magnetorheological fluid with a viscosity that varies in accordance with a magnetic field; a brake including a magnetorheological fluid and a generation system to generate a magnetic field on command; a sensor detecting the current position of the button; a mechanism determining speed of the button; and a controller configured
(Continued)

to send orders to the system to generate a magnetic field, the orders being generated according to the current position of the button and the current actuation speed of the button.

25 Claims, 8 Drawing Sheets

(51) Int. Cl.
    *B60K 35/00*     (2006.01)
    *B60K 37/06*     (2006.01)
    *B60T 13/66*     (2006.01)
    *H01H 19/00*     (2006.01)

(52) U.S. Cl.
    CPC .... *B60K 2350/102* (2013.01); *B60K 2350/92* (2013.01); *H01H 19/00* (2013.01); *H01H 2003/008* (2013.01)

(56) References Cited

U.S. PATENT DOCUMENTS

| | | |
|---|---|---|
| 2005/0184696 A1 | 8/2005 | Anastas et al. |
| 2007/0279401 A1 | 12/2007 | Ramstein et al. |
| 2008/0294984 A1 | 11/2008 | Ramsay et al. |
| 2011/0181405 A1 | 7/2011 | Periquet et al. |
| 2012/0267221 A1 | 10/2012 | Gohng et al. |
| 2014/0089792 A1 | 3/2014 | Ramsay et al. |
| 2014/0195906 A1 | 7/2014 | Ramsay et al. |
| 2015/0097774 A1 | 4/2015 | Kabasawa et al. |
| 2017/0227980 A1* | 8/2017 | Hafez ................... G06F 3/0362 |

OTHER PUBLICATIONS

French Search Report dated Jun. 17, 2015 in FR 1459182 filed Sep. 29, 2014.

\* cited by examiner

HAPTIC INTERFACE PROVIDING IMPROVED CONTROL OF THE HAPTIC SENSATION

FIELD OF THE INVENTION AND STATE OF THE RELATED ART

The present invention relates to a haptic interface providing improved control of the haptic sensation.

A haptic interface can take the form of a rotary button operated by a user, in this case, the interface opposes a torque resisting the user according to the angular position of the actuation button and the movement applied by the user, thus making it possible to define haptic patterns which will be perceived by the user when turning the button.

The resistant torque can be transmitted to the button via a magnetorheological fluid, the apparent viscosity whereof is modified by applying a magnetic field in order to define the predefined haptic patterns.

Some haptic patterns comprise numerous resistant torque variations in a relatively restricted angular zone. In this case, a decrease in the haptic sensation perceived by the user is observed when the actuation speed of the button increases.

DESCRIPTION OF THE INVENTION

Consequently, one aim of the invention is that of offering a haptic interface providing improved control of the haptic sensation.

The aim described above is achieved by a haptic interface comprising a member for interacting with the user and a member for interacting with a fluid, the apparent viscosity whereof varies according to a control stimulus, the two members being secured at least in rotation or at least in translation, means for generating a variable stimulus, a sensor for measuring the current position of the element for interacting with the user, and means suitable for modulating the variable stimulus applied to the fluid according to the current position of the element for interacting with the user and the actuation speed of the element for interacting with the user.

By means of the invention, by applying a haptic pattern which is dependent on the actuation speed of the element for interacting with the user, it is possible to modulate, for example accentuate the haptic sensation according to the actuation speed of the element for interacting with the user. This modulation can relate to modifications of amplitude or shape of the pattern. As such, accounting for the actuation speed in the selection of the haptic pattern value, the control of the haptic sensation is improved. For example, a decrease in the haptic sensation when the actuation speed is high is prevented.

Particularly advantageously, a low-speed pattern and a high-speed pattern are used and interpolation is performed between a value of a pattern at zero or low speed and a value of a pattern at high speed for the position measured.

In one embodiment, a low-speed pattern and a high-speed pattern are used and a threshold is set below which the actuation speed of the interaction element is considered to be low and beyond which the actuation speed of the element for interacting with the user is considered to be high, and one or the other of the patterns is applied according to whether the actuation speed is considered to be high or low.

In other words, for each current position, it is envisaged to apply at least two stimulus values, the intensities whereof can optionally be different in order to try to account for the actuation speed of the element for interacting with the user, whereas in the haptic interfaces according to the prior art, a single stimulus value is applied for each current position regardless of the actuation speed. Advantageously, a stimulus value is determined for each actuation speed value according to a predetermined computation law or algorithm taking the speed as the input parameter.

According to an additional feature, it can be envisaged to use a device for determining the user's intended action before the motion applied to the element for interacting with the user becomes perceptible for the user and for the position measurement sensor, in order to determine the direction of movement that the user intends to apply to the element for interacting with the user, which makes it possible to improve the haptic rendering further.

The subject-matter of the present invention thus is a haptic interface comprising:
- an element for interacting with a user suitable for moving in a first direction and in a second direction,
- an element for interacting with a fluid, the viscosity whereof varies according to an external stimulus, the element for interacting with the fluid being secured at least in translation or at least in rotation with the element for interacting with the user,
- a brake comprising a fluid, the viscosity whereof varies according to an external stimulus, and a system for generating said stimulus on command in said fluid, the element for interacting with the fluid being arranged in the fluid,
- means for determining a current position of the element for interacting with the user,
- means for determining the speed of the element for interacting with the user,
- a control unit suitable for sending orders to said system for generating said stimulus, the control unit comprising means for generating said orders according to the current position of the element for interacting with the user and the current actuation speed of the element for interacting with the user.

Very advantageously, the haptic interface can comprise means for determining the user's intended action on the element for interacting with the user.

For example, the means for determining the user's intended action on the element for interacting with the user comprise:
- means for detecting the torque applied by a user to the element for interacting with the user, in the case of a rotatable element for interacting with the user, in order to determine the direction of the torque and whether the torque is greater than a given value for a given direction, the control unit controlling the system for generating said stimulus on the basis of the information obtained on the torque at least when a zero or low speed of the element for interacting with the user is detected, or
- means for detecting the load applied by a user to the element for interacting with the user, in the case of a translatable element for interacting with the user, in order to determine the direction of the force and whether the force is greater than a given value for a given direction, the control unit controlling the system for generating said stimulus on the basis of the information obtained on the force at least when a zero or low speed of the element for interacting with the user is detected.

The means for detecting the torque or force applied by the user to the element for interacting with the user can comprise at least one load sensor, preferentially mounted pre-stressed, or at least one sensor of the strain induced by the torque or force to one of the elements of the haptic interface.

The haptic interface can comprise a proof body which is arranged so as to be strained by the torque or force applied by the user to the element for interacting with the user, the means for detecting the torque or force being in contact with said proof body. Preferably, the proof body is made of a material such that the strain thereof is not perceptible by the user.

In one example of an embodiment, the control unit can comprise at least:

- a first database containing values of a first haptic pattern when the norm of the actuation speed is less than or equal to a first given value and is not zero and the element for interacting with the user is moved in the first direction,
- a second database containing values of a second haptic pattern when the norm of the actuation speed is at least equal to a second given value and the element for interacting with the user is moved in the first direction,
- a third database containing values of a third haptic pattern when the norm of the actuation speed is less than or equal to a third given value and is not zero and the element for interacting with the user is moved in the second direction,
- a fourth database containing values of a fourth haptic pattern when the norm of the actuation speed is at least equal to a fourth given value and the element for interacting with the user is moved in the first direction, and the means suitable for generating orders using according to the direction of actuation of the element for interacting with the user, the first and/or second databases or the third and/or fourth databases to determine a value of a new haptic pattern on the basis whereof an order is generated.

In a further example of an embodiment, the control unit can comprise at least:

- a first database containing values of a first haptic pattern when the norm of the actuation speed is less than or equal to a first given value and the element for interacting with the user is moved in the first direction,
- a second database containing values of a second haptic pattern when the norm of the actuation speed is at least equal to a second given value and the element for interacting with the user is moved in the first direction,
- a third database containing values of a third haptic pattern when the norm of the actuation speed is less than or equal to a third given value and the element for interacting with the user is moved in the second direction,
- a fourth database containing values of a fourth haptic pattern when the norm of the actuation speed is at least equal to a fourth given value and the element for interacting with the user is moved in the first direction, and the means suitable for generating orders using according to the direction of actuation of the element for interacting with the user, the first and/or second databases or the third and/or fourth databases to determine a value of a new haptic pattern on the basis whereof an order is generated.

Advantageously, the means generating the orders apply an interpolation, for example a linear interpolation, between a value of the first database and a value of the second database or between a value of the third database and a value of the fourth database.

For example, the second given speed can be defined as being the maximum actuation speed in the first actuation direction and the fourth given speed is defined as being the maximum actuation speed in the second actuation direction.

In one advantageous embodiment, the fluid is a magnetorheological fluid, the stimulus being a magnetic field and the orders generated are current intensities.

The means for determining the actuation speed can for example compute the derivatives of the information provided by the means for determining the current position.

In one example of an embodiment, the element for interacting with the user is rotatable and is secured to a rotary shaft the longitudinal axis whereof the element for interacting with the fluid is secured in rotation, the means for measuring the angular position being an angular position sensor.

In a further example of an embodiment, the element for interacting with the user is translatable.

Another subject-matte of the present invention is a method for controlling a haptic interface according to the invention, comprising the following steps:

a) determining the current position of the element for interacting with the user,
b) determining the speed of the element for interacting with the user,
c) determining the direction of actuation,
d) determining, for the direction of actuation determined, a value of a haptic pattern for the actuation speed determined,
e) generating an order to the system for generating said stimulus.

During step d), the value of a haptic pattern can be determined on the basis of a first value of a haptic pattern for an actuation speed less than a first given value and not equal to zero and a second value of a haptic pattern for an actuation speed at least equal to a second given value.

For example, step d) is a step for computing said value of a haptic pattern for the actuation speed determined by means of a threshold function, the value of the pattern for the actuation speed determined being either the first value of a haptic pattern for an actuation speed less than a first given value, or the second value of a haptic pattern for an actuation speed at least equal to the second given value.

Advantageously, the method can comprise the step prior to step d) for determining the user's intended action on the element for interacting with the user. During step d), the value of a haptic pattern can be determined on the basis of a first value of a haptic pattern for an actuation speed less than or equal to a first given value optionally equal to zero and a second value of a haptic pattern for an actuation speed at least equal to a second given value.

Step d) can be a step for computing said value of a haptic pattern for the actuation speed determined by interpolation, for example by linear interpolation.

BRIEF DESCRIPTION OF THE FIGURES

The present invention will be understood more clearly on the basis of the following description and the appended figures wherein.

DETAILED DESCRIPTION OF PARTICULAR EMBODIMENTS

In the description hereinafter, the example of a haptic interface with a rotary button will be described in detail, but it will be understood that the invention is also applicable to a haptic interface with cursor type linear movement. Furthermore, the interface described uses a magnetorheological fluid, i.e. the apparent viscosity whereof varies according to the magnetic field applied, but the use of an electrorheological fluid, i.e. a fluid wherein the apparent viscosity is dependent on the electrical field applied, is not outside the scope of the present invention.

Figure 1A:
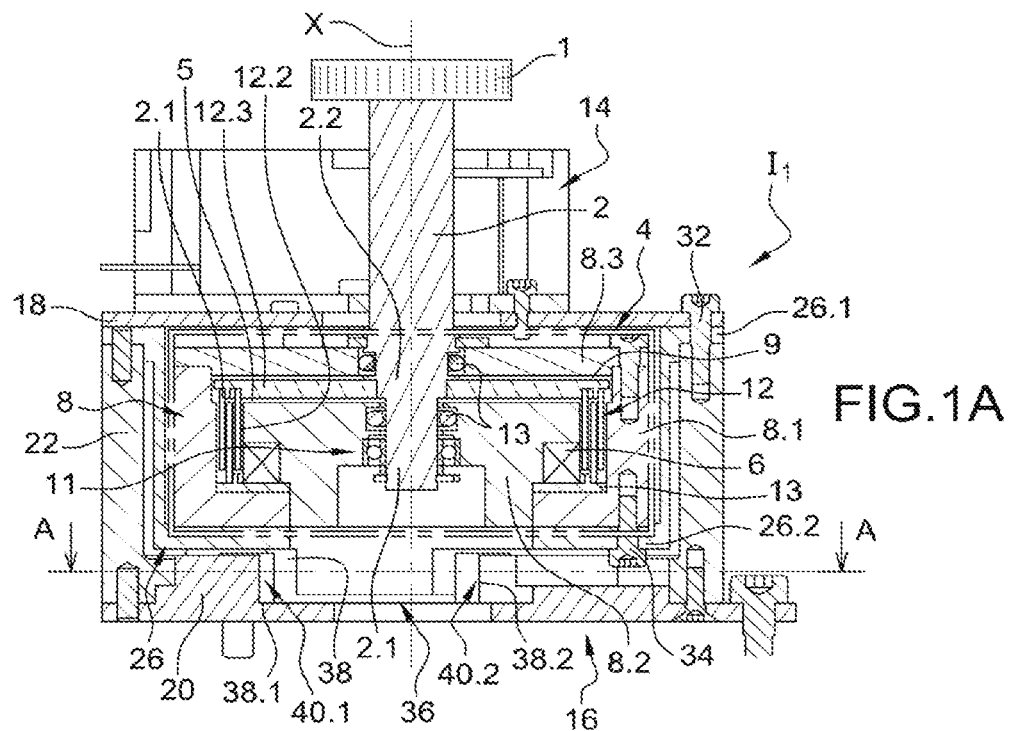
FIG. 1A is a sectional view of an example of an embodiment of a rotary haptic interface that can be used in the present invention.

In FIG. 1A, a longitudinal sectional view of an example of an embodiment of a rotary haptic interface 11 according to the invention can be seen.

The haptic interface 11 comprises an element 1 intended to be operated by a user and which will be hereinafter referred to as "button", this button is secured in rotation with a shaft 2 rotatable about the axis X, and a resistant load generating device 4 or magnetorheological brake opposing the rotation of the shaft 2.

The brake 4 comprises a fluid the characteristics whereof can be modified by means of a magnetic field and a system for generating a magnetic field 6 received in a housing 8. The fluid is, for example, a magnetorheological liquid. The assembly comprising the housing, the fluid and the system for generating a magnetic field forms a magnetorheological brake.

The housing 8 defines a tight chamber 9 containing the magnetorheological fluid. All or part of this chamber being subject to a magnetic field generated by the system 6. The housing 8 comprises a side wall 8.1, a bottom end 8.2 and a top end 8.3.

The shaft 2 passes through the top end 8.3, passes through the chamber 9 and traverses the bottom end 8.2. The end 2.1 of the shaft 2, opposite that supporting the button 1, is housed in the bottom end of the housing 8 and is guided in rotation by means of a bearing 11 mounted in the bottom end 8.2. Seals 13, for example O-rings, ensure the tightness between the shaft and the bottom and top ends.

The housing 8 defines a tight chamber confining the magnetorheological fluid.

The brake 4 also comprises an element 12 secured in rotation to the shaft 2 and housed in the tight chamber 10. This element is suitable for interacting with the magnetorheological fluid, the rotation of the element 12 being more or less braked by the magnetorheological fluid according to the apparent viscosity thereof.

In the example represented, the element 12 comprises two concentric side walls 12.1, 12.2 having a circular cross-section secured to an end 12.3, in turn secured in rotation with the shaft.

Alternatively, the element 12 can only comprise one side wall or more than two concentric side walls. Also alternatively, the element 12 could be formed by a disk. Moreover, the interaction element could comprise slots and/or projecting or hollow portions in order to increase the resistance to movement.

In the example represented, the bottom end 8.2 of the housing 8 has a shape such that the internal volume of the tight chamber 9 has a shape corresponding to that of the interaction element 12, which makes it possible to reduce the quantity of fluid required. In the example represented, a cylindrical element 13 with a circular cross-section secured to the housing is inserted between the two side walls 12.1, 12.2, which contributes to the shearing effect of the magnetorheological fluid when the side walls 12.1 and 12.2 are rotated.

The side walls 12.1, 12.2 of the element 12 can be made of magnetic or a magnetic material.

In the example represented, the system for generating a variable magnetic field 6 comprises a coil mounted on the housing and arranged inside the interaction element 12, and a current power supply (not shown) controlled by a control unit according to the operation of the button and pre-recorded patterns.

The interface also comprises a position sensor 14 which is, in the example represented, situated outside the housing and partially secured to the shaft 2. The position sensor 14 makes it possible to measure the current position of the button, which is in the example represented the current angular position. It can consist for example of an incremental optical encoder.

The haptic interface also comprises a frame 16 wherein the housing 8 is arranged. The frame 16 comprises a first and a second end flange 18, 20 and a side wall 22 secured to the two flanges 18, 20, the first flange 18 is traversed by the rotary shaft. The position sensor 14 is mounted on the first flange of the frame.

The brake is intended to apply a resistant load opposing the movement of the element for interacting with the user. This resistant load is determined on the basis of predefined haptic patterns according to the haptic rendering sought to be reproduced, these patterns are recorded in a database.

A pattern is defined by a braking load to be applied according to the following data:
  the current angular position of the button,
  the current direction of rotation of the button,
  the rotational speed of the button.

A haptic pattern is thus a set of braking load values to be applied to the button, i.e. a set of values defining the pattern, each value of the haptic pattern is associated with a given angular position of the button and with a direction of rotation of the button. This braking load value corresponds to an apparent viscosity value which corresponds to a magnetic field value which corresponds to a current intensity supplying the system generating the magnetic field, for example a coil.

It is obvious that the same pattern value can be assigned for different angular positions, or a plurality of different linear positions in the case of a linear interface.

Figure 2:
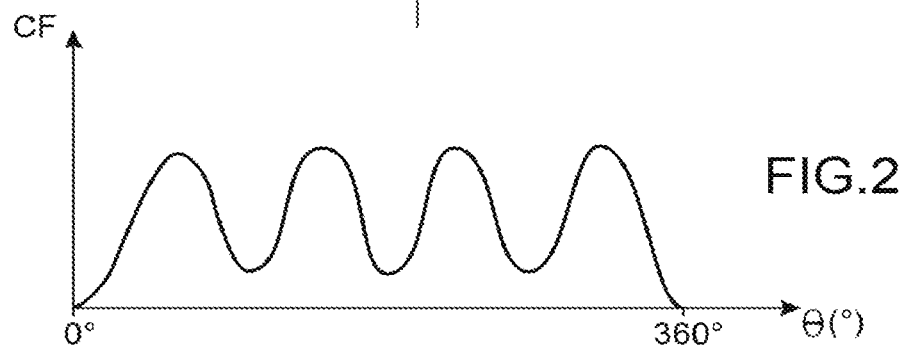
FIG. 2 is a graphic representation of the variation of the braking load applied by a magnetorheological brake according to the angular position of an element for interacting with the user for a pattern in a given direction and for a given speed.

In FIG. 2, a graphic representation of any haptic pattern can be seen. The braking load CF applied by the brake according to the angular position in degrees θ is represented. Each angle value has a corresponding braking load value.

Figure 1B:
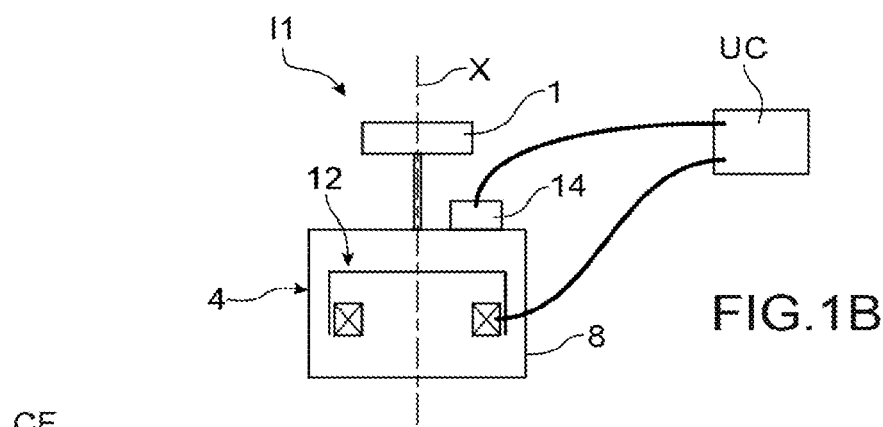
FIG. 1B is a schematic representation of a rotary interface according to the invention.

The haptic interface comprises a control unit UC configured to generate orders to said system for generating a magnetic field such that it applies the values of the pattern to be reproduced. In FIG. 1B, a schematic representation of the interface 11 can be seen.

According to the invention, the control unit UC accounts for the value of the actuation speed of the button, in addition to the movement direction, to generate the order to the system for generating a magnetic field.

For this, four patterns are defined:
- a pattern MPL defined for the direction of actuation considered to be positive of the button and for a low rotational speed;
- a pattern MPR defined for the positive direction of actuation of the button and for a high rotational speed;
- a pattern MNL defined for the direction of actuation considered to be negative of the button and for a low rotational speed;
- a pattern MNR defined for the negative direction of actuation of the button and for a high rotational speed.

The low speed is a speed for which the value is less than or equal to a given threshold but is not zero.

The high speed is considered to be the maximum speed with which the button can be actuated. The high speed in the positive direction can be equal or different to the high speed in the negative direction.

The actuation speed is advantageously approximated on the basis of the information provided by the position sensor, which makes it possible to offer a compact system. Nevertheless, any other device distinct from the position sensor could be used to determine the rotational speed.

Figure 4:
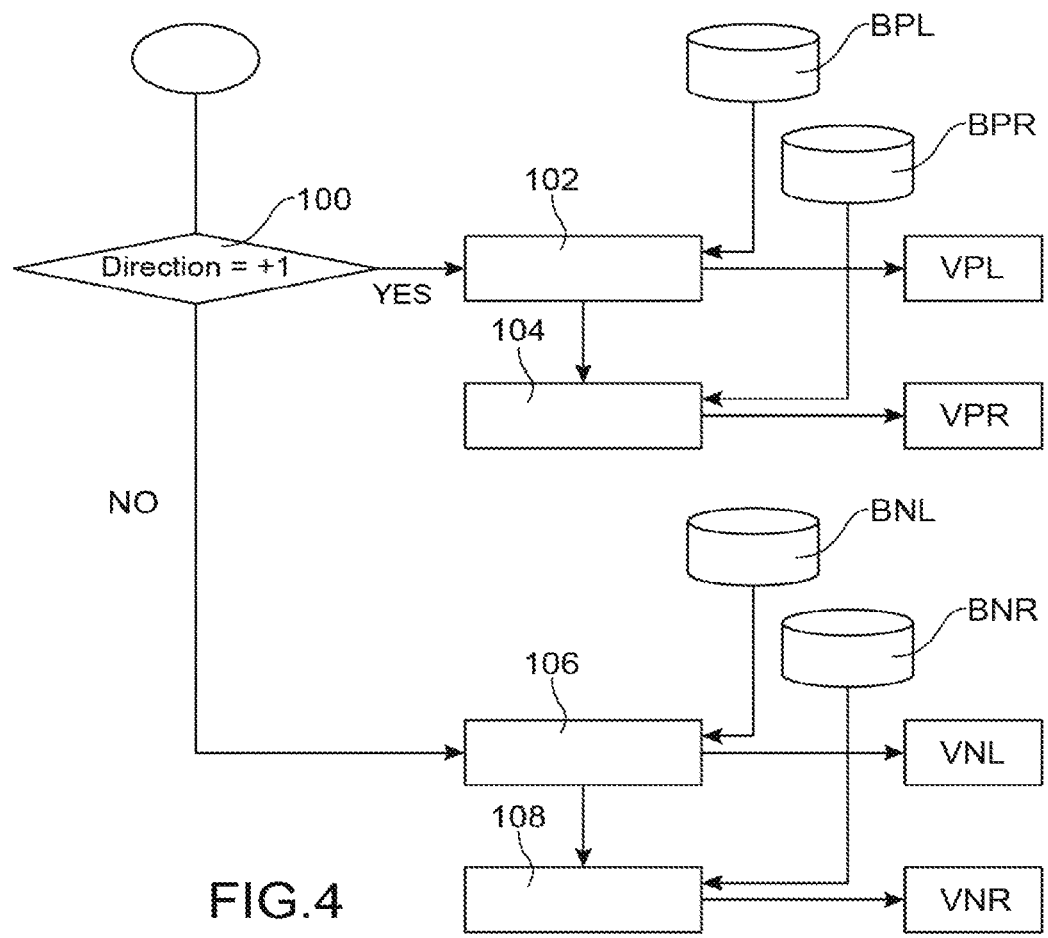
FIGS. 4 and 5 represent examples of control algorithms of the haptic interface according to the invention.

In FIG. 4, a first algorithm for selecting the choice of pattern values to be taken into account is represented.

During a first step 100, the position of the button, the actuation speed (SPEED variable) and the actuation direction (DIRECTION variable) are determined on the basis of the information provided by the current position sensor. The DIRECTION variable can adopt the value +1 (movement direction considered to be positive), the value −1 (movement direction considered to be negative) or the value 0 when the speed is zero.

If the DIRECTION variable is equal to +1, then:
- a search will be run in the low-speed positive pattern database BPL for the pattern value VPL (step 102), and
- a search will be run in the high-speed positive pattern database BPR for the pattern value VPR (step 104).

The steps 102 and 104 can be simultaneous or sequential.

Otherwise, if the DIRECTION variable is equal to −1 or 0, then:
- a search will be run in the low-speed negative pattern database BNL for the pattern value VNL (step 106), and
- a search will be run in the high-speed negative pattern database BNR for the pattern value VNR (step 108).

At the end of the first algorithm process, two pattern values are obtained, either VPL and VPR, or VNL and VNR.

Figure 5:
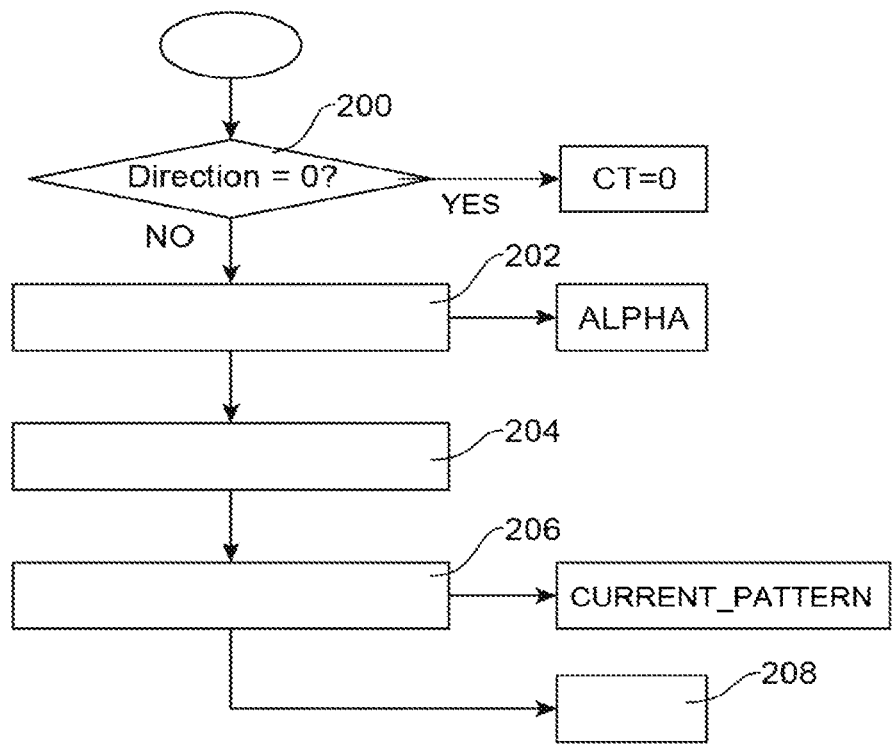

In FIG. 5, an advantageous example of a second algorithm suitable for determining the braking load or the current intensity, the latter being considered to be proportional, to be applied to the system for generating a magnetic field, can be seen.

During a first step 200, it is checked whether the DIRECTION variable is equal to 0, if this is the case, in this example the control unit generates an order to the brake not to apply any load to the button, i.e. no magnetic field is applied to the fluid. The algorithm is completed. Alternatively, it could be decided to keep the last magnetic field applied. This step could take place before the step 102.

If the DIRECTION variable is different to 0, i.e. if it is equal to +1 or −1 then, during a subsequent step 202, the coefficient ALPHA is computed which is equal to: (abs (SPEED)−V_MIN)/(V_MAX−V-MIN).

where abs(SPEED) is the absolute value of the SPEED variable, where V_MAX is the set value of the maximum actuation speed, this value is set for example to the usual maximum rotational speed with which a user usually actuates the button when seeking to make quick and rough movements with the interface.

where V_MIN is the set value of the minimum actuation speed, this value is set for example to the usual minimum rotational speed with which a user usually actuates the button when seeking to make slow and precise movements with the interface.

V_MAX corresponds to the high speed at which the patterns MPR and MNR are established without correction.

V_MIN corresponds to the low speed at which the patterns MPL and MNL are established without correction.

During a subsequent step 204, the coefficient ALPHA is advantageously limited between 0 and 1 to prevent aberrant computation results, indeed it can arise that, exceptionally, the button is actuated at a speed greater than the maximum speed set, i.e. that the computation of the value ALPHA gives a result greater than 1 since nothing is limiting the actuation speed mechanically. Similarly, it can arise that, exceptionally, the button is actuated at a speed less than the minimum speed set, i.e. that the computation of the value ALPHA gives a result less than 0 since it is possible to choose a value different to zero for V_MIN.

During a subsequent step 206, the CURRENT_PATTERN variable is computed using a linear interpolation on the basis of the pattern values selected by the first algorithm.

CURRENT_PATTERN=(1−ALPHA)*VPL+ ALPHA*VPR if the actuation direction is positive or CURRENT_PATTERN=(1−ALPHA)*VNL+ ALPHA*VNR if the actuation direction is negative.

During a subsequent step 208, the CURRENT_PATTERN variable is applied to the brake.

Figure 3:
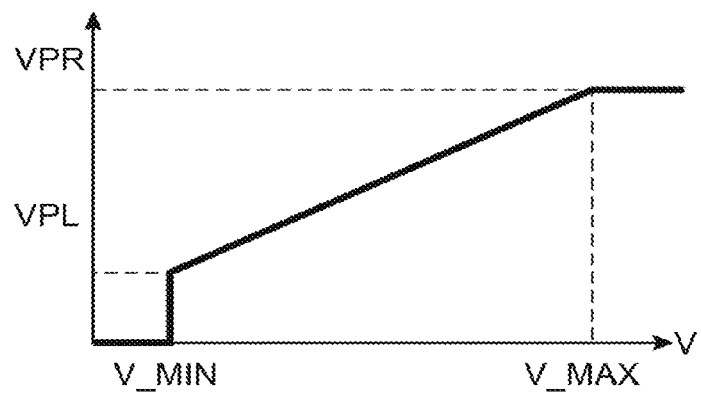
FIG. 3 is a graphic representation of the braking level applied by the magnetorheological brake according to the actuation speed of the element for interacting with the user.

In the algorithm in FIG. 5, the CURRENT_PATTERN is computed on the basis of a linear interpolation. In FIG. 3, a representation of this pattern according to the actuation speed in the case of an actuation in the positive direction can be seen.

Any other interpolation, for example a quadratic interpolation, can be used.

It can also be envisaged to use a threshold function, the CURRENT_PATTERN adopting one value for a speed less than or equal to a threshold value and adopting another value for a speed greater than the threshold value.

In the algorithm in FIG. 5, the braking load is accentuated with the actuation speed in the case of the selection of VPR>VPL (or VNR>VNL respectively for the other actuation direction).

It can on the other hand be envisaged that the braking load decreases whereas the actuation speed increases or that the relationship between the CURRENT PATTERN and the speed is not monotonic.

The algorithms described above are fully applicable to a linear haptic interface, the position sensor would then determine longitudinal positions and not angular positions.

In one particularly advantageous embodiment, it is envisaged to use a system for determining the user's intended action in order to improve the general haptic rendering of the interface further.

The system for determining the user's intended action detects the torque applied by the user to the button in the case of a rotary interface or the force applied by the user to the button in the case of a linear interface, before a movement of the button perceptible by the user and by the position sensor is applied thereto.

Figure 6:
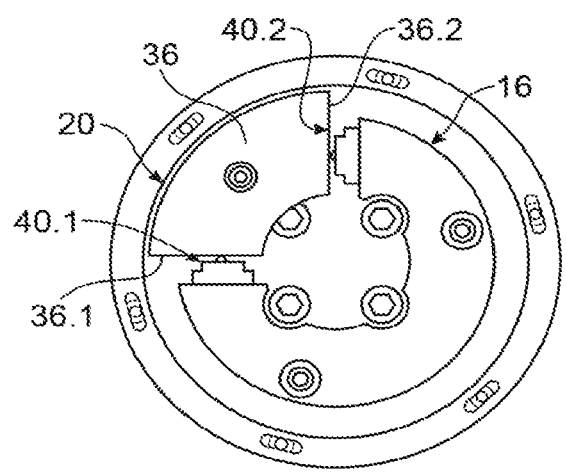
FIG. 6 is a transversal sectional view along the plane A-A of the interface in FIG. 1.
Figure 7:
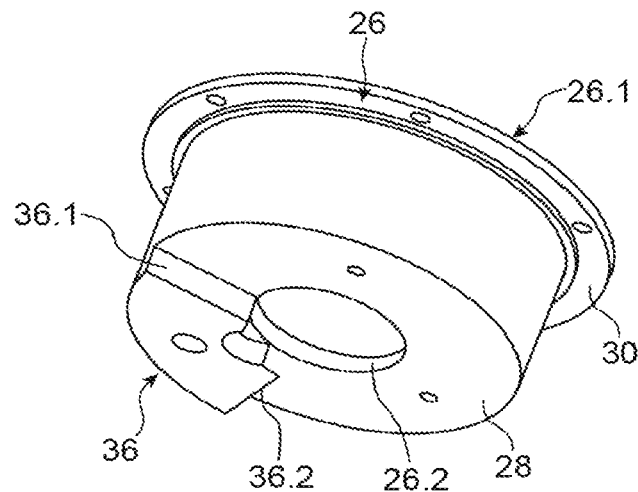
FIG. 7 is a perspective view of an example of an embodiment of a proof body used in the interface in FIG. 6.

In the example represented in FIGS. 1A and 6, such a system is used, it comprises a proof body 26 wherein the strain induced by the torque applied by the user is to be detected with load sensors. The proof body is represented on its own in FIG. 7. The proof body 26 is secured by a longitudinal end 26.1 to the frame 16 and by the other longitudinal end 26.2 to the magnetorheological brake, to the housing 8 in the example represented. The load sensors are in contact with the proof body at the longitudinal end 26.2 thereof secured to the housing 8.

In the example represented in FIGS. 1 and 6, the proof body 26 comprises a body of cylindrical shape with a circular cross-section closed by a bottom 28 at the longitudinal end 26.2. An annular collar 30 extends radially outwards at the other longitudinal end 26.1.

The internal diameter of the proof body corresponds to the external diameter of the housing 8, increased by a functional clearance. The bottom of the proof body is arranged between the housing and the second flange 20 of the frame 16.

The proof body is secured to the frame by means of at least one screw 32 through the flange 18 and the collar 30. In the example represented, the screws 32 also serve to connect the flange 18 to the side wall 28.

The bottom 28 of the proof body is secured to the housing 8 by at least one screw 34.

The proof body 26 also comprises an element 36 protruding from the longitudinal end 26.2 thereof opposite that in contact with the housing. The element 36 is received in a cavity 38 formed in the flange 20 of the frame.

In the example represented, the protruding element 36 has the shape of an angular portion centred on the longitudinal axis. The angular portion 36 is defined by two faces 36.1, 36.2. The cavity 38 has a shape corresponding to that of the angular portion 36 and is defined by two faces 38.1 38.2 each facing one face 36.1, 36.2 of the angular portion 36. A load sensor 40.1 is mounted on the face 38.1 of the cavity in contact with the face 36.1 of the angular portion and a load sensor 40.2 is mounted on the face 38.2 of the cavity in contact with the face 36.2 of the angular portion 36. A point type mechanical contact is provided between each load sensor 40.1, 40.2 and the proof body 26. The load sensors 40.1, 40.2 are advantageously mounted pre-stressed.

As such, when a torque is applied to the button, the latter induces a torsional strain of the proof body 26 via the housing 8 in turn interacting with the fluid, in turn interacting with the interaction element 12, in turn connected to the shaft 2. This strain is detected by one or the other of the load sensors 40.1, 40.2 according to the direction of rotation of the button.

The proof body is for example made of plastic material, such as ABS.

The material of the proof body and the geometry thereof can be determined according to the minimum torque and the maximum torque applied, the sensitivity of the load sensors and the detection threshold sought. Furthermore, the strain of the proof body is such that it is not perceptible by the user. For example, it can be considered that a strain of the proof body of a few microns is not perceptible by the user.

Alternatively, the loads could be measured directly on the housing 8 or on the rotary shaft, for this a torque sensor would be used. However, a torque sensor has a high cost and a significant size compared to force sensors. Moreover, a torque sensor provides a precise and calibrated torque value whereas this information is not useful within the scope of the invention.

The load sensor is for example embodied using piezoresistive elements assembled in the form of a Wheatstone bridge, they allow a sensitivity of the order of some tens of mV per Newton with a sufficiently high stiffness to limit the movement to some tens of microns at full load. Alternatively, the load sensor(s) could be replaced by one or more strain sensors formed, for example, by strain gauges directly applied to the proof body to detect the strain thereof.

Figure 8:
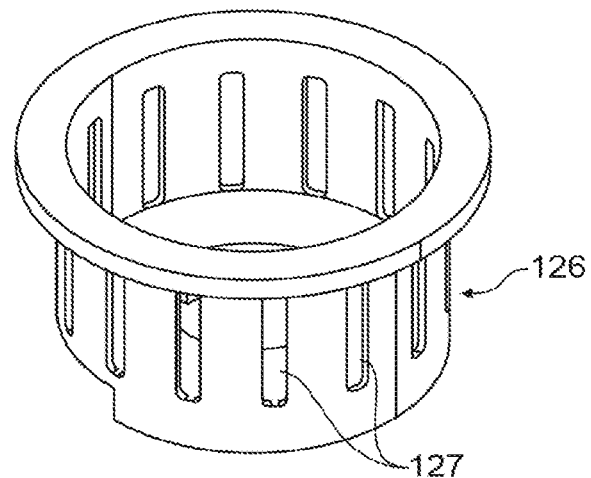
FIG. 8 is a perspective view of a further example of an embodiment of a proof body that can be used in the interface in FIG. 6.
Figure 9:
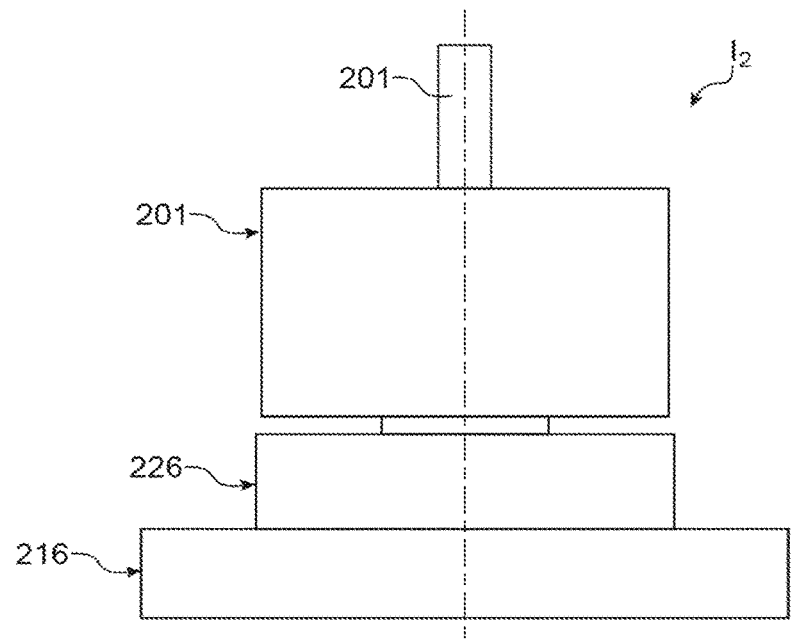
FIG. 9 is a side view of a further example of a haptic interface.
Figure 10A:
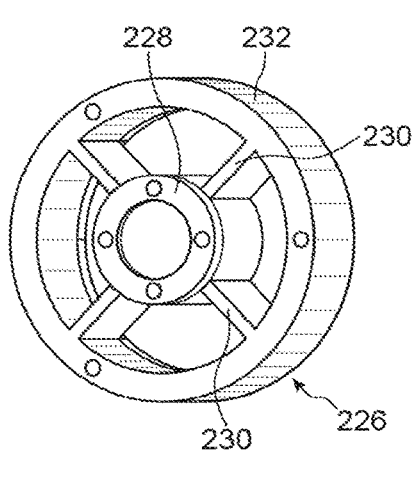
FIGS. 10A to 10C are different views of the proof body used in the interface in FIG. 9.
Figure 10B:
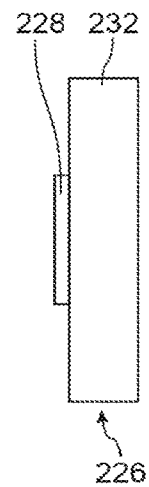
Figure 10C:
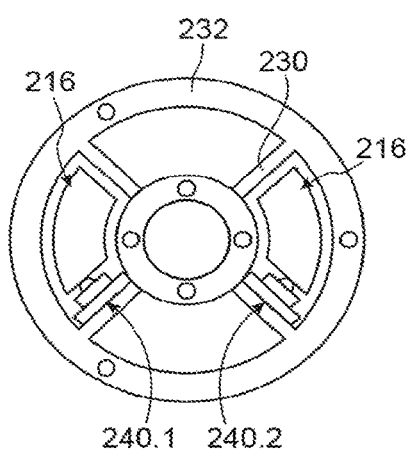

In FIG. 8, a further example of a proof body 126 can be seen, the general shape whereof is identical to that of the proof body 26, but further comprises longitudinal slots 127 in the side wall of the proof body 126. Preferably, the slots 127 are distributed angularly in a regular fashion. The proof body exhibits in this embodiment a greater capacity for strain. It is for example made of aluminium alloy.

Slots inclined with respect to the longitudinal axis and/or having a shape other than rectilinear for example a curved shape are not outside the scope of the present invention. Moreover, the slots are not necessarily all the same size.

Advantageously, it is possible to envisage means for amplifying the strain of the proof body under an axial torsional strain while reducing the strain of the proof body for any other strain not relevant within the scope of the invention, such as for example a radial strain applied to the button parasitically by the user. The sensitivity of detection is thus improved and the disturbances or false detections can be eliminated.

The example of a proof body in FIGS. 1A, 6 to 8 makes it possible to increase the sensitivity of the measurement device by arranging the sensors over the greatest possible diameter.

In the example represented and advantageously, the walls 36.1 and 36.2 of the protruding element are arranged at 90° with respect to one another. This positioning associated with a point contact at the load sensors 40.1 and 40.2 makes it possible to break down the deformation strain of the proof body and give priority to the sensitivity to loads along two orthogonal components situated in the plane of the frame 16. As such, for example, the sensitivity is significantly reduced for parasitic loads applied perpendicularly to the plane of the frame 16. Furthermore, computational or algorithmic processing on the components of the orthogonal forces measured by the sensors 40.1 and 40.2, such as for example a computation based on the difference in measurement between the two sensors weighted by the common measurement components of the two sensors in the case of a preferential assembly of the sensors with load pre-stress, makes it possible to reduce to a certain degree the sensitivity to parasitic loads applied parallel with the plane of the frame 16.

An example of operation of the device wherein the user's intended action is determined will now be described.

The user turns the button about the axis thereof in a first direction of rotation and brings it to an angular position defined as a stop. A magnetic field is applied to the magnetorheological fluid such that the variation in apparent viscosity thereof generates a torque at the element for interacting with the fluid simulating a stop at the button in the first direction of rotation.

If the user holds the load on the button in the first direction of rotation, the proof body 26 is subjected to a torsional torque via the housing, the housing interacting with the fluid, the fluid interacting with the interaction element 12, the interaction element being connected to the shaft 2.

This strain is measured by the force sensor arranged downstream in the first direction of rotation. Knowing which of the force sensors is actuated makes it possible to determine the direction wherein the user intends to turn the button. Preferentially, the measurements from the two force sensors assembled with load pre-stress can be combined to determine the direction wherein the user intends to turn the button. The detection of a minimum torque makes it possible to confirm that the user indeed intends to pivot the button. It is inferred that the user intends to hold the button at a stop. The magnetic field is maintained so as to oppose a load for the movement of the interaction element 12 via the viscous magnetorheological fluid.

If the user intends to pivot the button in a second direction opposite the first direction, the load sensor arranged upstream with respect to the first direction of rotation will be actuated. Preferentially, the measurements from the two force sensors assembled with load pre-stress can be combined to determine the new direction wherein the user intends to turn the button. The user's intention is inferred therefrom, this intention is confirmed by the detection of a minimum torque. In this case, the magnetic field is cancelled, the apparent viscosity of the fluid decreases significantly, the interaction element can thus rotate in the second direction without experiencing a sticking effect. As such, the operation of a free wheel can be reproduced by means of the invention.

In FIGS. 9 and 10A to 10C, a further example of an embodiment of an interface 12 according to the invention can be seen, comprising a frame 216, a brake 204, a proof body 226 having the shape of a wheel and an element for interacting with the user 201, the element for interacting with the fluid not being shown.

The wheel comprises a hub 228, an outer ring 232 and spokes 230 connecting the hub 228 to the outer ring 232.

In this example, the hub 228 is secured to the housing of the interface for example by screws axially traversing the hub 228 and the outer ring 232 is secured to the frame for example by screws axially traversing the outer ring.

Two load sensors 240.1, 240.2 are arranged bearing each against a spoke 230 and arranged with respect to the spokes such that, when the proof body 226 is actuated in one direction of rotation, only one of the sensors is actuated. The load sensors are mounted on the frame 216 and bearing against one face of a spoke 230. Alternatively, the load sensors could be assembled with a load pre-stress, or, as mentioned above, be replaced by elongation gauges arranged on the proof body and detecting the strain for example of the spokes under the effect of the torsional torque. More generally, the load sensors can be replaced by strain sensors.

The operation of this device is similar to that of the device in FIG. 1A described above.

Means for applying mechanical stress to the proof body, such as rotational or translational guiding means, can advantageously be added, which makes it possible to reduce the number of force sensors by assembling the latter with a load pre-stress.

The data obtained from these force or strain sensors are processed by an electronic system in order to determine whether the torque applied by the user to the interface exceeds a predetermined threshold. The torque sign is also determined and makes it possible to determine the direction wherein the user intends to move the button.

As mentioned above, knowledge of the actual value of the torsional torque is not required, knowledge of the direction of torsion is sufficient. It is thus possible to use low-cost sensors suitable for detecting at least a binary threshold or a monotonic function of the load or the strain, apart from any linearity, dynamic, resolution type specification, etc., insofar as the sensor is sufficiently sensitive to detect a minimum torque acting on the interface without there being any rotation thereof. The sensor is also such that it is capable of holding a maximum load without degradation.

Figure 11:
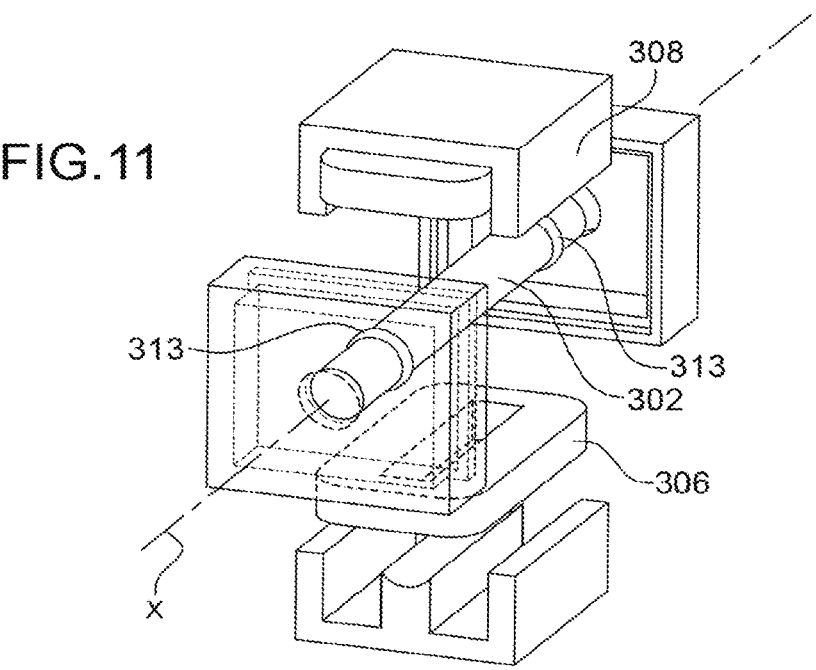
FIG. 11 is an exploded view of an example of a linear haptic interface that can be used in the invention.

In FIG. 11, an exploded view of a schematically represented example of a linear haptic interface according to the invention can be seen.

The device comprises a housing 308 wherein is mounted a shaft 302 suitable for moving axially along the axis X thereof, the shaft 302 being configured to support an element for interacting with the user (not shown) at the level of at least one of the longitudinal ends thereof, means for generating a variable magnetic field 306 are arranged in the housing. The housing defines a tight chamber which contains magnetorheological fluid and which is traversed by the shaft 302. Seals 313 ensure tight sliding of the shaft in the chamber.

The interface also comprises a position sensor (not shown) suitable for measuring the current longitudinal position of the shaft 302.

The interface also comprises means for detecting the user's intended action, these means thus detect a translation force applied by the user to the shaft before a movement of the shaft perceptible by the user and by the position sensor is applied thereon. These means comprise a proof body (not shown), the strain whereof is measured by one or more force or strain sensors, the proof body being mounted on the housing and on the frame (not shown). If the user intends to move the shaft in the first direction of translation, the proof body is subjected to a shear force via the housing, in turn interacting with the fluid, in turn interacting with the interaction element, in turn connected to the shaft 302.

We shall now describe the algorithms for operating the haptic interface according to the invention and accounting for the user's intended action. In the present case, we will focus particularly on the cases wherein the rotational speed of the button is zero or at least less than a value below which the movement of the button is considered to be imperceptible.

The control electronics jointly use the information of the angular position sensor and the information of the load sensors to determine the resistant torque to be generated by the brake 4.

Figure 12:
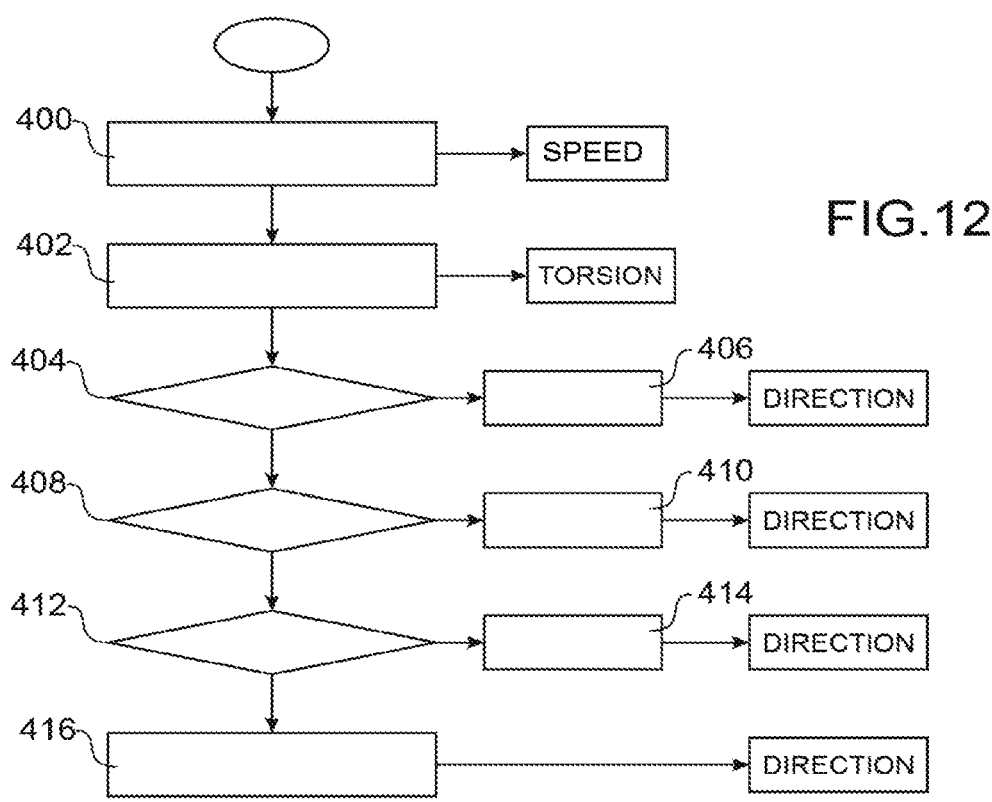
FIG. 12 represents an example of a control algorithm of the haptic interface according to the invention.

The algorithm represented in FIG. 12 is applied to determine the direction of rotation wherein the button is turned or wherein the user intended to turn same.

The TORSION variable which is an estimation of the torsional torque is used. Knowledge of the precise value of the torque is not required. This estimation is obtained on the basis of the information provided by the force sensor which is actuated by the proof body in the example of an embodiment in FIGS. 1A, 6 to 8. The estimation of the torsional torque makes it possible to determine whether the latter is greater or less than threshold values accounting for the direction wherein the torsional torque is applied.

During a first step 400, the movement speed of the button is computed. The SPEED variable is obtained.

The speed is considered to be zero when it is less than a given actual value and hence the approximation of the derivative of the information provided by the angular sensor sampled at a frequency Te returns to a zero value.

During a subsequent step 402, the estimation function of the torsional moment applied by the user is computed on the basis of the information provided by the load sensors, this function is the TORSION variable.

During a subsequent step 404, it is checked whether the SPEED variable is zero, if it is not zero, the sign of the speed is assigned to the DIRECTION variable (step 406).

If the SPEED variable is zero, the TORSION variable is used.

In a subsequent step 408; it is checked whether the TORSION variable is greater than a so-called "Positive threshold" threshold, if this is the case, the value +1 is assigned to the DIRECTION variable (step 410).

Otherwise, in a subsequent step 412, it is checked whether the TORSION variable is less than a so-called "Negative threshold" threshold, if this is the case, the value −1 is assigned to the DIRECTION variable (step 414).

Otherwise, i.e. if the speed is zero and the torsional torque is greater than the negative threshold and is less than the positive threshold, then, during a subsequent step 316, the DIRECTION variable adopts the value of zero. The system considers that no torque is applied to the button, it can for example be inferred therefrom that the user has released the button.

By means of this algorithm, it is possible to determine in the case where the movement speed of the button is zero the direction wherein the user intends to move the button without a significant movement thereof.

Indeed, it is possible by means of the information provided only by the force or strain sensor(s) to determine the direction wherein the torsional torque is applied, even without significant movement of the button, and therefore decide the direction wherein the user intends to move the button, and on this basis control the system for generating a variable magnetic field accordingly.

Then, a variant embodiment of the algorithm in FIG. 4 is applied.

In this alternative embodiment, the following four patterns are defined:
- a pattern MPL' defined for the direction of actuation considered to be positive of the button and for a zero or low rotational speed;
- a pattern MPR' defined for the positive direction of actuation of the button and for a high rotational speed;
- a pattern MNL' defined for the direction of actuation considered to be negative of the button and for a zero or low rotational speed;
- a pattern MNR' defined for the negative direction of actuation of the button and for a high rotational speed.

The zero or low speed is a speed for which the value is less than or equal to a given threshold. As the user's intended action is determined, it is possible to define a zero speed in the positive direction and a zero speed in the negative direction. Indeed, the user may not move the button, the SPEED variable is equal to 0 but the torque applied in one direction or in the other can be different to 0. The absence of the user's intended action is given when the DIRECTION variable=0.

As above, the high speed is considered to be the maximum speed with which the button can be actuated. The high speed in the positive direction can be equal or different to the high speed in the negative direction.

Figure 13:
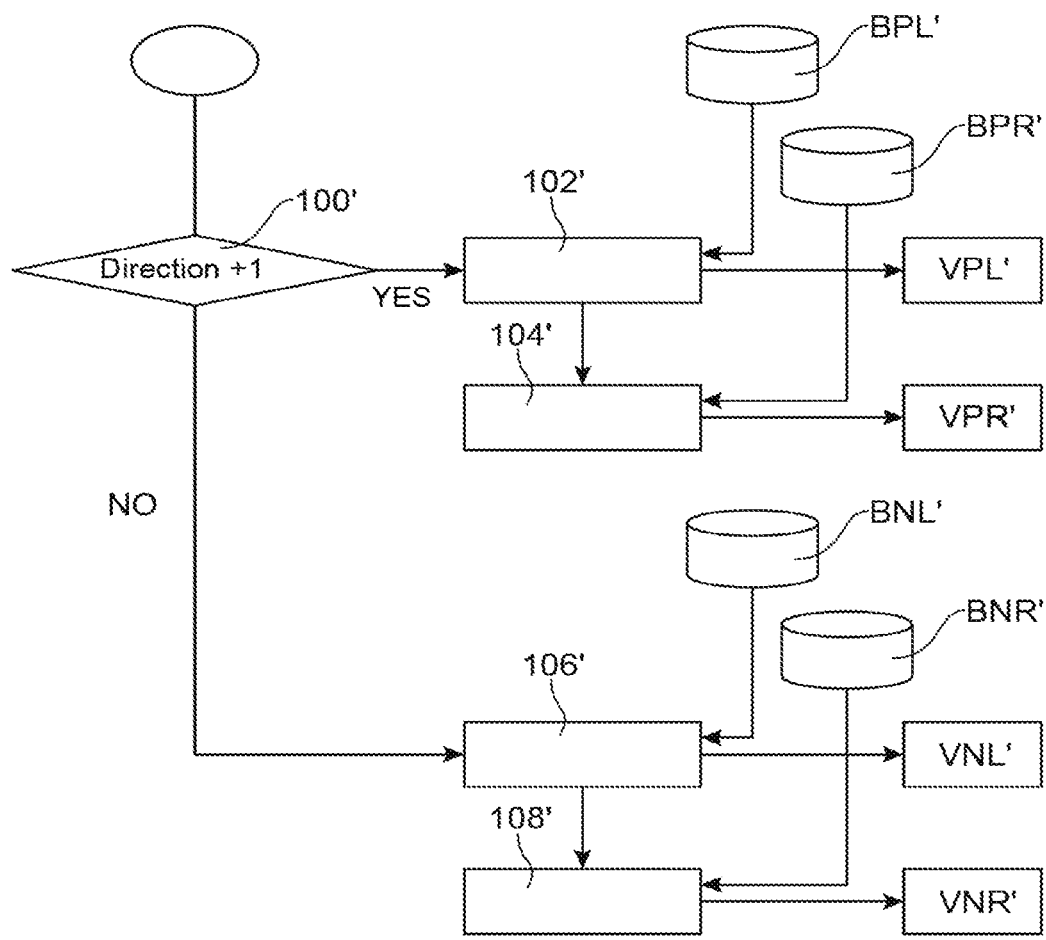
FIGS. 13 and 14 represent alternative embodiments of the algorithm in FIGS. 4 and 5 respectively, accounting for the knowledge of the user's intended action.

In FIG. 13, the alternative embodiment of algorithm in FIG. 4 for selecting the choice of pattern values to be taken into account is represented.

During a first step 100', it is checked whether the DIRECTION variable is equal to +1, if this is the case then:
- a search will be run in the low-speed positive pattern database BPL' for the pattern value VPL' (step 102'), and
- a search will be run in the high-speed positive pattern database BPR' for the pattern value VPR' (step 104').

The steps 102' and 104' can be simultaneous or sequential.

Otherwise, i.e. if the DIRECTION variable is equal to 0 or −1, then:
- a search will be run in the low-speed negative pattern database BNL' for the pattern value VNL' (step 106), and
- a search will be run in the high-speed negative pattern database BNR' for the pattern value VNR' (step 108).

At the end of the first algorithm process, two pattern values are obtained, either VPL' and VPR', or VNL' and VNR'.

Figure 14:
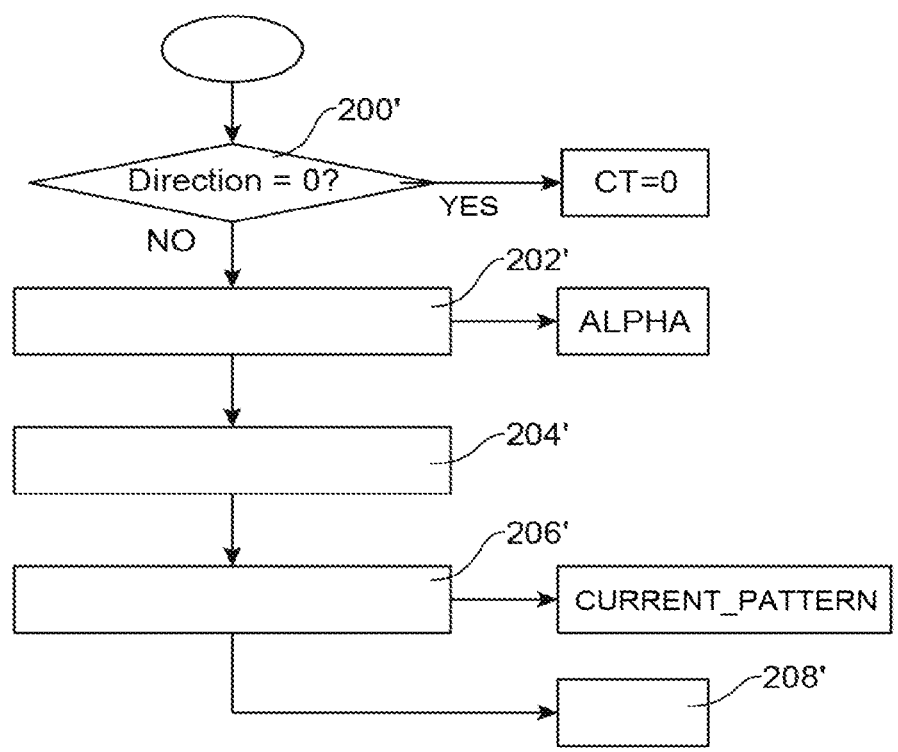

As a variant of the algorithm in FIG. 5 represented in FIG. 14 is then applied to effectively determine the value of the braking load to be applied, i.e. the magnetic field to be applied, and thus the current intensity to supply the system for generating a magnetic field.

During a first step 200', it is checked whether the DIRECTION variable is equal to 0, if this is the case, the control unit generates an order to the brake not to apply any load to the button, i.e. no magnetic field is applied to the fluid. The algorithm is completed. In this algorithm, the fact that DIRECTION=0 means that it has been determined that the user did not intend to actuate the button in one direction or in the other. It can for example by inferred therefrom that the user has released the button. This step could take place before the step 102'.

If the DIRECTION variable is different to 0, i.e. if it is equal to +1 or −1 then, during a subsequent step 202', the coefficient ALPHA is computed which is equal to: abs (SPEED)/V_MAX.

where abs(SPEED) is the absolute value of the current speed, where PARAMETER V_MAX is the set value of the maximum actuation speed.

During a subsequent step 204', the coefficient ALPHA is advantageously limited between 0 and 1 to prevent computing errors, indeed it can arise that, exceptionally, the button is actuated at a speed greater than the maximum speed set, i.e. that ALPHA is greater than 1 since nothing is limiting the actuation speed mechanically.

During a subsequent step 206', the CURRENT_PATTERN variable is computed using a linear interpolation on the basis of the pattern values selected by the first algorithm.

CURRENT_PATTERN=(1−ALPHA)*VPL'+
ALPHA*VPR' if the actuation direction is positive or CURRENT_PATTERN=(1−ALPHA)*VNL'+
ALPHA*VNR' if the actuation direction is negative.

During a subsequent step 208', the CURRENT_PATTERN variable is applied to the brake.

As for the algorithm in FIG. 5, the CURRENT_PATTERN could be computed with any other interpolation, for example, a quadratic interpolation can be used. It can also be envisaged to use a threshold function.

The algorithms described above are fully applicable to a linear haptic interface, the position sensor then determines longitudinal positions and not angular positions.

Knowing the absence of user intention makes it possible for example to switch off the power supply of the current of the system generating the magnetic field while being sure that the user does not intend to move the button, which improves the haptic rendering. On the other hand, without this knowledge, the current could be switched off fortuitously while the user has already applied a torque to the button not perceived by the system.

The haptic interface according to the invention is particularly suitable for an application in motor vehicles, for example to form an onboard haptic interface assisting the motor vehicle driver. It can assist the user in interacting with the various vehicle equipment or accessories such as the GPS (Global Positioning System), radio, air conditioning, etc.

The invention claimed is:

1. A haptic interface comprising:
   a user interaction element for interacting with a user configured to move in a first direction and in a second direction;
   a fluid interaction element for interacting with a fluid, viscosity whereof varies according to an external stimulus, the fluid interaction element being secured at least in translation or at least in rotation with the user interaction element;
   a brake comprising a fluid, viscosity whereof varies according to a brake external stimulus, and a generation system for generating the brake external stimulus on command in the fluid, the fluid interaction element being arranged in the fluid;
   a current position sensor for determining a current position of the user interaction element;
   a speed sensor for determining speed of the user interaction element;
   a control circuitry configured to send orders to the system to generate each stimulus, the control circuitry comprising:
      an order generator to generate the orders according to the current position of the user interaction element and the current actuation speed of the user interaction element;
      a first database containing values of a first haptic pattern when norm of the actuation speed is less than or equal to a first given value and is not zero and the user interaction element is moved in the first direction,
      a second database containing values of a second haptic pattern when the norm of the actuation speed is at least equal to a second given value and the user interaction element is moved in the first direction,
      a third database containing values of a third haptic pattern when the norm of the actuation speed is less than or equal to a third given value and is not zero and the user interaction element is moved in the second direction,
      a fourth database containing values of a fourth haptic pattern when the norm of the actuation speed is at least equal to a fourth given value and the user interaction element is moved in the second direction; and
   wherein the order generator uses, according to a direction of actuation of the user interaction element, the first and/or second databases or the third and/or fourth databases to determine a value of a new haptic pattern on the basis whereof an order is generated.

2. A haptic interface according to claim 1, wherein the generator order applies an interpolation between a value of the first database and a value of the second database or between a value of the third database and a value of the fourth database.

3. A haptic interface according to claim 1, wherein the generator order applies a linear interpolation between a value of the first database and a value of the second database or between a value of the third database and a value of the fourth database.

4. A haptic interface according to claim 1, wherein the second given value is defined as maximum actuation speed in the first direction and the fourth given value is defined as maximum actuation speed in the second direction.

5. A haptic interface according to claim 1, wherein the fluid is a magnetorheological fluid, each stimulus being a magnetic field, and wherein the orders generated are current intensities.

6. A haptic interface according to claim 1, wherein the speed sensor computes derivatives of information provided by the current position sensor for determining the current position.

7. A haptic interface according to claim 1, wherein the user interaction element is rotatable and is secured to a rotary shaft, the longitudinal axis whereof the fluid interaction element is secured in rotation, the current position sensor being an angular position sensor.

8. A haptic interface according to claim 1, wherein the user interaction element is translatable.

9. A method for controlling a haptic interface according to claim 1, comprising:
   a) determining the current position of the user interaction element;
   b) determining the speed of the user interaction element;
   c) determining the direction of actuation;
   d) determining, for the direction of actuation determined, a value of a haptic pattern for the actuation speed determined, the value of a haptic pattern being determined on the basis of a first value of a haptic pattern for an actuation speed less than the first given value and not equal to zero and a second value of a haptic pattern for an actuation speed at least equal to the second given value;
   e) generating an order to the system for generating each stimulus.

10. A control method according to claim 9, wherein d) computes the value of a haptic pattern for the actuation speed determined by a threshold function, the value of the pattern for the actuation speed determined being either the first value of a haptic pattern for an actuation speed less than the first given value, or the second value of a haptic pattern for an actuation speed at least equal to the second given value.

11. A control method according to claim 9, wherein d) computes the value of a haptic pattern for the actuation speed determined by interpolation.

12. A haptic interface comprising:
a user interaction element for interacting with a user configured to move in a first direction and in a second direction;
a fluid interaction element for interacting with a fluid, viscosity whereof varies according to an external stimulus, the fluid interaction element being secured at least in translation or at least in rotation with the user interaction element;
a brake comprising a fluid, viscosity whereof varies according to a brake external stimulus, and a generation system for generating the brake external stimulus on command in the fluid, the fluid interaction element being arranged in the fluid;
a current position sensor for determining a current position of the user interaction element;
a speed sensor for determining speed of the user interaction element;
a control circuitry configured to send orders to the system to generate each stimulus, the control circuitry comprising means for generating the orders according to the current position of the user interaction element and the current actuation speed of the user interaction element;
means for determining the user's intended action on the user interaction element, comprising a torque sensor to detect torque or force applied by the user to the user interaction element, in a case of a rotatable user interaction element, to determine direction of the torque and whether the torque is greater than a given value for a given direction, the control circuitry controlling the generation system for generating the stimulus on the basis of the information obtained on the torque at least when a zero or low speed of the user interaction element is detected, or a load sensor to detect load applied by a user to the user interaction element, in a case of a translatable element for interacting with the user, to determine the direction of the force and whether the force is greater than a given value for a given direction, the control circuitry controlling the generation system to generate each stimulus on the basis of the information obtained on the force at least when a zero or low speed of the user interaction element is detected,
wherein the control circuitry comprises:
a first database containing values of a first haptic pattern when norm of the actuation speed is less than or equal to a first given value and the user interaction element is moved in the first direction,
a second database containing values of a second haptic pattern when the norm of the actuation speed is at least equal to a second given value and the user interaction element is moved in the first direction,
a third database containing values of a third haptic pattern when the norm of the actuation speed is less than or equal to a third given value and the user interaction element is moved in the second direction,
a fourth database containing values of a fourth haptic pattern when the norm of the actuation speed is at least equal to a fourth given value and the user interaction element is moved in the second direction; and wherein the means for generating orders uses, according to a direction of actuation of the user interaction element, the first and/or second databases or the third and/or fourth databases to determine a value of a new haptic pattern on the basis whereof an order is generated.

13. A haptic interface according to claim 12, wherein the torque or load sensor applied by the user to the user interaction element comprises at least one load sensor, mounted pre-stressed, or at least one sensor of strain induced by the torque or force to one of the elements of the haptic interface.

14. A haptic interface according to claim 13, wherein the at least one load sensor is mounted pre-stressed.

15. A haptic interface according to claim 12, further comprising a proof body configured to be strained by the torque or force applied by the user to the user interaction element, the torque or load sensor being in contact with the proof body.

16. A haptic interface according to claim 15, wherein the proof body is made of a material such that the strain thereof is not perceptible by the user.

17. A haptic interface according to claim 12, wherein the means for generating the orders applies an interpolation between a value of the first database and a value of the second database or between a value of the third database and a value of the fourth database.

18. A haptic interface according to claim 12, wherein the means for generating the orders applies a linear interpolation between a value of the first database and a value of the second database or between a value of the third database and a value of the fourth database.

19. A haptic interface according to claim 12, wherein the second given value is defined as maximum actuation speed in the first direction and the fourth given value is defined as maximum actuation speed in the second direction.

20. A haptic interface according to claim 12, wherein the fluid is a magnetorheological fluid, the stimulus being a magnetic field, and wherein the orders generated are current intensities.

21. A haptic interface according to claim 12, wherein the speed sensor computes derivatives of information provided by the current position sensor for determining the current position.

22. A haptic interface according to claim 12, wherein the user interaction element is rotatable and is secured to a rotary shaft, the longitudinal axis whereof the fluid interaction element is secured in rotation, the current position sensor being an angular position sensor.

23. A haptic interface according to claim 12, wherein the user interaction element is translatable.

24. A method for controlling a haptic interface according to claim 12, comprising:
a) determining the current position of the user interaction element;
b) determining the speed of the user interaction element;
c) determining the direction of actuation;
d) determining, for the direction of actuation determined, a value of a haptic pattern for the actuation speed determined;
e) generating an order to the system for generating the stimulus;
the method further comprising prior to d) determining a user's intended action on the user interaction element, and wherein during d), the value of a haptic pattern is determined on the basis of a first value of a haptic pattern for an actuation speed less than or equal to the first given value optionally equal to zero and a second value of a haptic pattern for an actuation speed at least equal to the second given value.

25. A control method according to claim 24, wherein d) computes the value of a haptic pattern for the actuation speed determined by interpolation.

* * * * *